(12) United States Patent
Ghosh et al.

(10) Patent No.: US 11,646,852 B2
(45) Date of Patent: May 9, 2023

(54) UPLINK TRANSPORT PROTOCOL ACKNOWLEDGMENT SHAPING AND DOWNLINK DATA SHAPING AT A USER EQUIPMENT

(71) Applicant: QUALCOMM Incorporated, San Diego, CA (US)

(72) Inventors: Priyangshu Ghosh, Hyderabad (IN); Arnaud Meylan, San Diego, CA (US); Vaibhav Kumar, Encinitas, CA (US); Sitaramanjaneyulu Kanamarlapudi, San Diego, CA (US); Alok Mitra, San Diego, CA (US); Vamsi Krishna Dokku, San Diego, CA (US); Ravi Balasubramanian, La Jolla, CA (US); Mohammed Ali, San Diego, CA (US); Rushil Gholap, San Diego, CA (US); Narender Mannem, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 16/991,901

(22) Filed: Aug. 12, 2020

(65) Prior Publication Data
US 2021/0050984 A1    Feb. 18, 2021

Related U.S. Application Data

(60) Provisional application No. 62/886,119, filed on Aug. 13, 2019.

(51) Int. Cl.
*H04L 5/00* (2006.01)
*H04W 72/0446* (2023.01)
*H04W 28/02* (2009.01)

(52) U.S. Cl.
CPC .......... *H04L 5/0082* (2013.01); *H04L 5/0055* (2013.01); *H04W 28/0278* (2013.01); *H04W 72/0446* (2013.01)

(58) Field of Classification Search
CPC ... H04L 5/0082; H04L 5/0055; H04L 1/1874; H04L 1/1854; H04W 28/0278; H04W 72/0446; H04W 72/1284
See application file for complete search history.

(56) References Cited

U.S. PATENT DOCUMENTS

| | | | |
|---|---|---|---|
| 2015/0215218 A1* | 7/2015 | Kanamarlapudi | .. H04L 47/2466 370/235 |
| 2017/0063498 A1* | 3/2017 | Ven | ........................ H04L 1/1635 |
| 2022/0070722 A1* | 3/2022 | Wang | ................ H04W 28/0289 |

OTHER PUBLICATIONS

Chan M.C., et al., "TCP/IP Performance Over 3G Wireless Links with Rate and Delay Variation", Proceedings of the 8th Annual International Conference on Mobile Computing and Networking, MOBICOM 2002, Atlanta, GA, Sep. 23-28, 2002, [Annual International Conference on Mobile Computing and Networking], New York, NY, ACM, US, Sep. 23, 2002 (Sep. 23, 2002), XP058146916, pp. 71-82, abstract p. 6, col. 2, last par. p. 7, col. 2, par 2.

(Continued)

*Primary Examiner* — Rina C Pancholi
(74) *Attorney, Agent, or Firm* — Patterson + Sheridan, LLP

(57) ABSTRACT

Certain aspects of the present disclosure provide techniques for uplink transport protocol acknowledgment shaping and downlink data shaping at a user equipment. A method that may be performed by the UE generally includes determining an allowed number of transport protocol acknowledgments to transmit in a transmission time interval (TTI); and transmitting one or more transport protocol acknowledgments in the TTI based, at least in part, on the determined allowed number of transport protocol acknowledgments. Another (Continued)

method that may be performed by the UE generally includes determining an allowed number of downlink data units to transmit in a TTI; and transmitting one or more data units in the TTI based, at least in part, on the determined allowed number of data units.

30 Claims, 11 Drawing Sheets

(56) References Cited

OTHER PUBLICATIONS

International Search Report and Written Opinion—PCT/US2020/046187—ISA/EPO—dated Dec. 23, 2020.
Partial International Search Report—PCT/US2020/046187—ISA/EPO—dated Oct. 28, 2020.
Peng F., et al., "Performance Analysis of Token-Based Fast TCP in Systems Supporting Large Windows", Local Computer Networks, 2002. Proceedings, LCN 2002, 27th Annual IEEE Conference on Nov. 6-8, 2002, Piscataway, NJ, USA, IEEE, Nov. 6, 2002 (Nov. 6, 2002), XP010628149, pp. 53-61, p. 2, col. 1, par. 3 figure 1.

* cited by examiner

UPLINK TRANSPORT PROTOCOL ACKNOWLEDGMENT SHAPING AND DOWNLINK DATA SHAPING AT A USER EQUIPMENT

CROSS-REFERENCE TO RELATED APPLICATIONS

This application claims benefit of and priority to U.S. Provisional Application No. 62/886,119, filed Aug. 13, 2019, which is hereby assigned to the assignee hereof and hereby expressly incorporated by reference herein in its entireties as if fully set forth below and for all applicable purposes.

FIELD OF THE DISCLOSURE

Aspects of the present disclosure relate to wireless communications, and more particularly, to techniques for shaping the delivery of transport protocol acknowledgments for uplink transmission and downlink data shaping at a user equipment (UE).

Introduction

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved uplink transport protocol acknowledgment shaping and downlink data at the user equipment (UE) modem to avoid sending a large burst of transport protocol acknowledgments that could lead to overflow the buffer at the base station (BS).

Aspects of the present disclosure provide means for, apparatus, processors, and computer-readable mediums for performing techniques and methods described herein for uplink acknowledgment shaping and downlink data shaping.

For example, certain aspects provide a method for wireless communication by a UE. The method generally includes determining an allowed number of transport protocol acknowledgments to transmit in a transmission time interval (TTI) and transmitting one or more transport protocol acknowledgments in the TTI based, at least in part, on the determined allowed number of transport protocol acknowledgments.

Certain aspects provide an apparatus for wireless communication by a UE. The apparatus generally includes at least one processor configured to: determine an allowed number of transport protocol acknowledgments to transmit in a transmission time interval (TTI) and transmit one or more transport protocol acknowledgments in the TTI based, at least in part, on the determined allowed number of transport protocol acknowledgments. The apparatus also generally includes a memory coupled with the at least one processor.

Certain aspects provide an apparatus for wireless communication by a UE. The apparatus generally includes means for determining an allowed number of transport protocol acknowledgments to transmit in a transmission time interval (TTI) and means for transmitting one or more transport protocol acknowledgments in the TTI based, at least in part, on the determined allowed number of transport protocol acknowledgments.

Certain aspects provide a non-transitory computer-readable medium for wireless communication by a UE. The non-transitory computer-readable medium generally includes instructions that, when executed by at least one processor, cause the at least one processor to determine an allowed number of transport protocol acknowledgments to transmit in a transmission time interval (TTI) and transmit one or more transport protocol acknowledgments in the TTI based, at least in part, on the determined allowed number of transport protocol acknowledgments.

Certain aspects provide a method for wireless communication by a UE. The method generally includes determining an allowed number of downlink data units to transmit in a TTI and transmitting one or more data units in the TTI based, at least in part, on the determined allowed number of data units.

Certain aspects provide an apparatus for wireless communication by a UE. The apparatus generally includes at least one processor configured to: determine an allowed number of downlink data units to transmit in a TTI and transmit one or more data units in the TTI based, at least in part, on the determined allowed number of data units. The apparatus also generally includes a memory coupled with the at least one processor.

Certain aspects provide an apparatus for wireless communication by a UE. The apparatus generally includes means for determining an allowed number of downlink data units to transmit in a TTI and means for transmitting one or more data units in the TTI based, at least in part, on the determined allowed number of data units.

Certain aspects provide a non-transitory computer-readable medium for wireless communication by a UE. The non-transitory computer-readable medium generally includes instructions that, when executed by at least one processor, cause the at least one processor to determine an allowed number of downlink data units to transmit in a TTI and transmit one or more data units in the TTI based, at least in part, on the determined allowed number of data units.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for shaping the delivery of transport protocol acknowledgments (ACKs) for uplink transmissions and shaping of downlink data, for example at a user equipment (UE) modem, to avoid the transmission of a large burst of transport protocol ACKs that could lead to overflow a buffer at the BS. As will be described in more detail herein, the uplink transport protocol ACK shaping includes determining an allowed number of transport protocol ACKs to transmit in a transmission time interval (TTI), such as in a physical uplink shared channel (PUSCH) slot or mini-slot, and the downlink data shaping includes determining an allowed number of downlink data units to forward to a transport protocol host at the UE in a time duration (such as a slot, mini-slot, or TTI), after they are received from a physical downlink shared channel (PD SCH).

The following description provides examples for uplink transport protocol ACK shaping and downlink data shaping at a UE, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Figure 1:
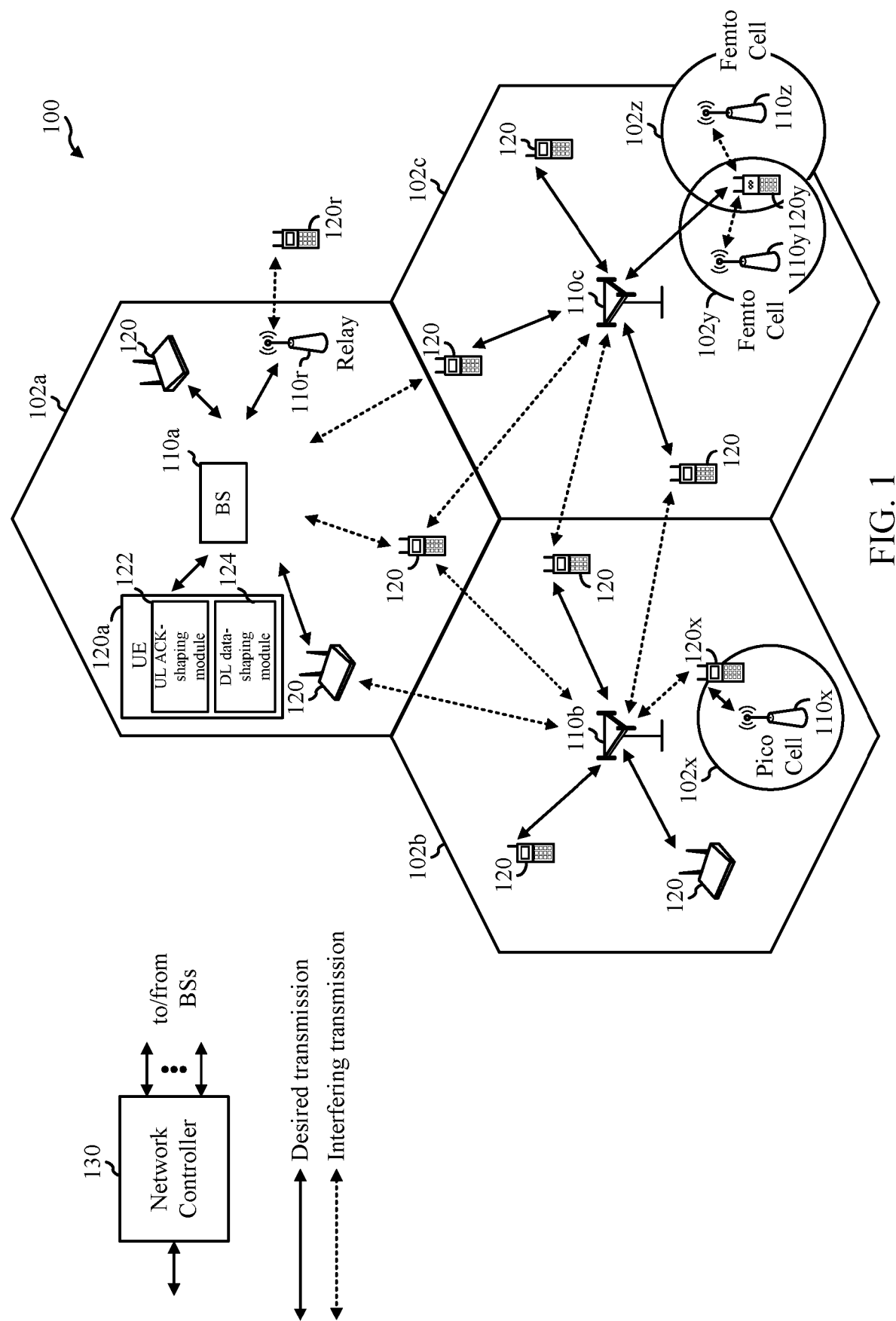
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

According to certain aspects, the BSs 110 and UEs 120 may be configured for uplink and downlink transmissions. The BS 110*a* may serve as a link between the UE 110*a* and a transport protocol server. The UE 110*a* may be configured to perform uplink transport protocol acknowledgement (ACK) shaping and/or downlink (DL) data shaping. For example, as shown in FIG. 1, the UE 120*a* includes an UL ACK-shaping module 122. The UL ACK-shaping module 122 may be configured to perform the operations shown in FIG. 5, as well as other operations for performing the various techniques discussed herein for UL transport protocol ACK shaping. For example, in some cases, the UL ACK-shaping module 122 may be configured to determine the allowed number of UL transport protocol ACKs to transmit in a TTI, in accordance with aspects of the present disclosure. The UL ACK-shaping module 122 may be further configured to transmit one or more transport protocol ACKs in the TTI based, at least in part, on the determined allowed number of transport protocol ACKs.

Additionally, as shown in FIG. 1, the UE 120*a* includes a downlink data-shaping module 124. The downlink data-shaping module 124 may be configured to perform the operations shown in FIG. 6, as well as other operations for performing the various techniques discussed herein for DL data shaping. For example, in some cases, the downlink data-shaping module 124 may be configured to determine the allowed number of downlink data units to transmit in a TTI, in accordance with aspects of the present disclosure. The downlink data-shaping module 124 may be further configured to transmit one or more data units in the TTI based, at least in part, on the determined allowed number of data units.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
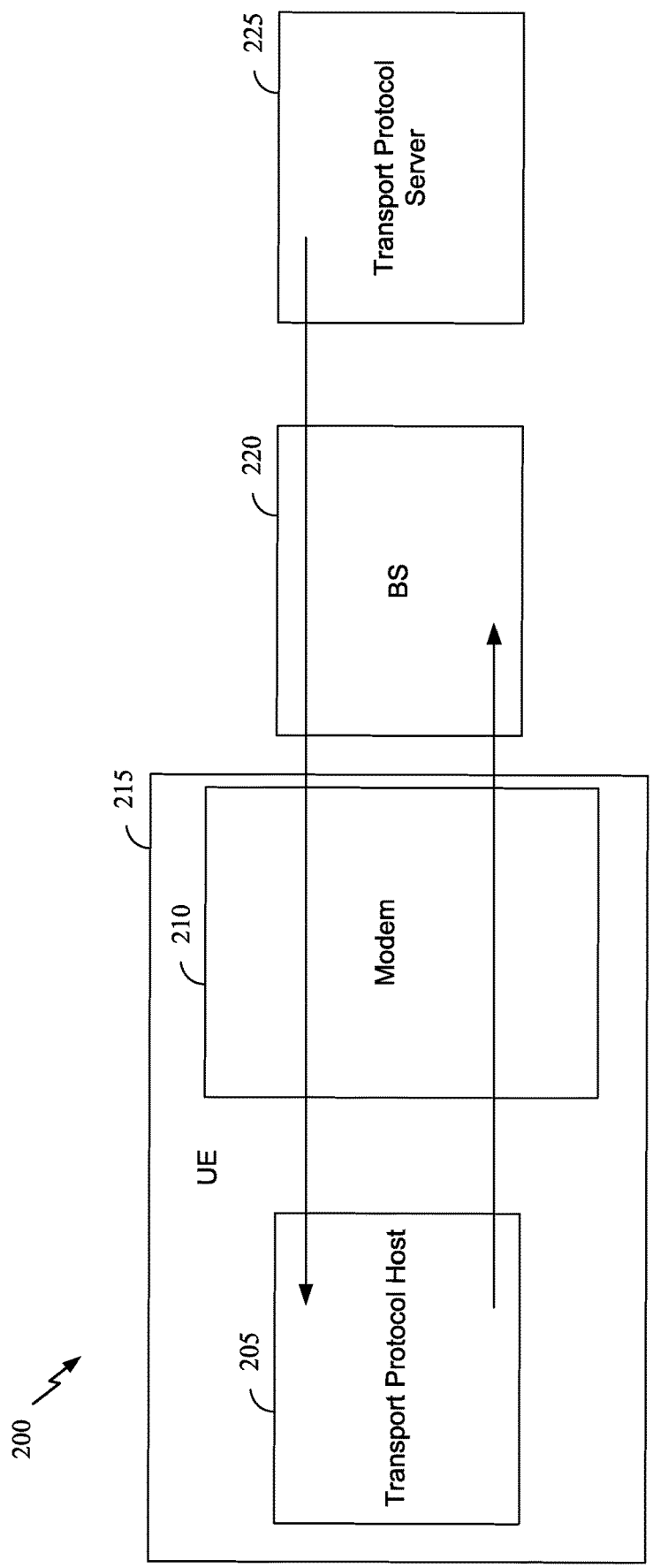
FIG. 2 is a block diagram conceptually illustrating a user equipment (UE), base station (BS), and server configured for transport control protocol (TCP), in accordance with certain aspects of the present disclosure.

FIG. 2 illustrates a block diagram of a transport protocol system 200 including a UE 215 (e.g., such as the UE 120*a* illustrated in FIG. 1), BS 220 (e.g., such as the BS 110*a* illustrated in FIG. 1), and transport protocol server 225. As shown in FIG. 2, the UE 215 may include a transport protocol host 205 (e.g., a TCP stack at the UE 215). The transport protocol 205 may control and convert signals transmitted and received by the UE 215 for the transport protocol. The UE 215 also includes a modem 210 (e.g., for signaling at the packet data convergence protocol layer). The BS 220 may provide the link between the UE 215 and the transport protocol server 225. The transport protocol host and transport protocol server 225 may be endpoints for the transport protocol.

In some examples, the transport protocol is a transport control protocol (TCP), which is a protocol of the Internet protocol (IP) suite. In some cases, TCP may be referred to as TCP/IP. The TCP may provide a stream of ordered and error-checked octets (bytes) between applications running on hosts communicating via a network. The TCP may be bi-directional (e.g., both uplink and downlink). The TCP may be used in multi-subscriber identity module (MSIM) scenarios, also referred to as concurrent RAT where one hardware (e.g., one modem) is used for multiple subscriptions (e.g., for multiple operators) any may have to perform tune-away between subscriptions to search for pages or other mobility procedures. In some examples, TCP uses a sliding window flow control protocol, wherein in each TCP segment (e.g., packet), the receiving (e.g., the transport protocol host 205 on the downlink) specifies in an amount of additionally received data (in bytes) corresponding to an acknowledgement (ACK) sequence number, as well as additional data it is willing to buffer for the connection (e.g., in a receive window). The sending host (e.g., the transport protocol server 220) may send only up to that amount of data before the sending host waits for an acknowledgement and window update from the receiving host.

Some TCP implementations may include four phases of congestion control: slow-start, congestion avoidance, fast retransmit, and fast recovery. For congestion avoidance, ACKs for data sent and/or lack of ACKs, are used by senders to infer network conditions between the TCP sender and receiver. Coupled with timers, TCP senders and receivers may alter the behavior of the flow of data. Enhancing TCP to reliably handle loss, minimize errors, manage congestion and go fast in very high-speed environments are ongoing areas of research and standards development. As a result, there are a number of TCP congestion avoidance algorithm variations.

Throughput issues may arise when the instantaneous transport protocol ACKing rate on the uplink or downlink is high. In some cases, modems (e.g., such as the modem 210) transmit transport protocol ACKs at a high rate, allowing a transport protocol sender (e.g., such as the transport protocol server 220) to issue a large amount of data (e.g., a spike or burst of packets), which in turn may create buffer overflow at a bottleneck (e.g., such as at the BS 220).

Figure 3:
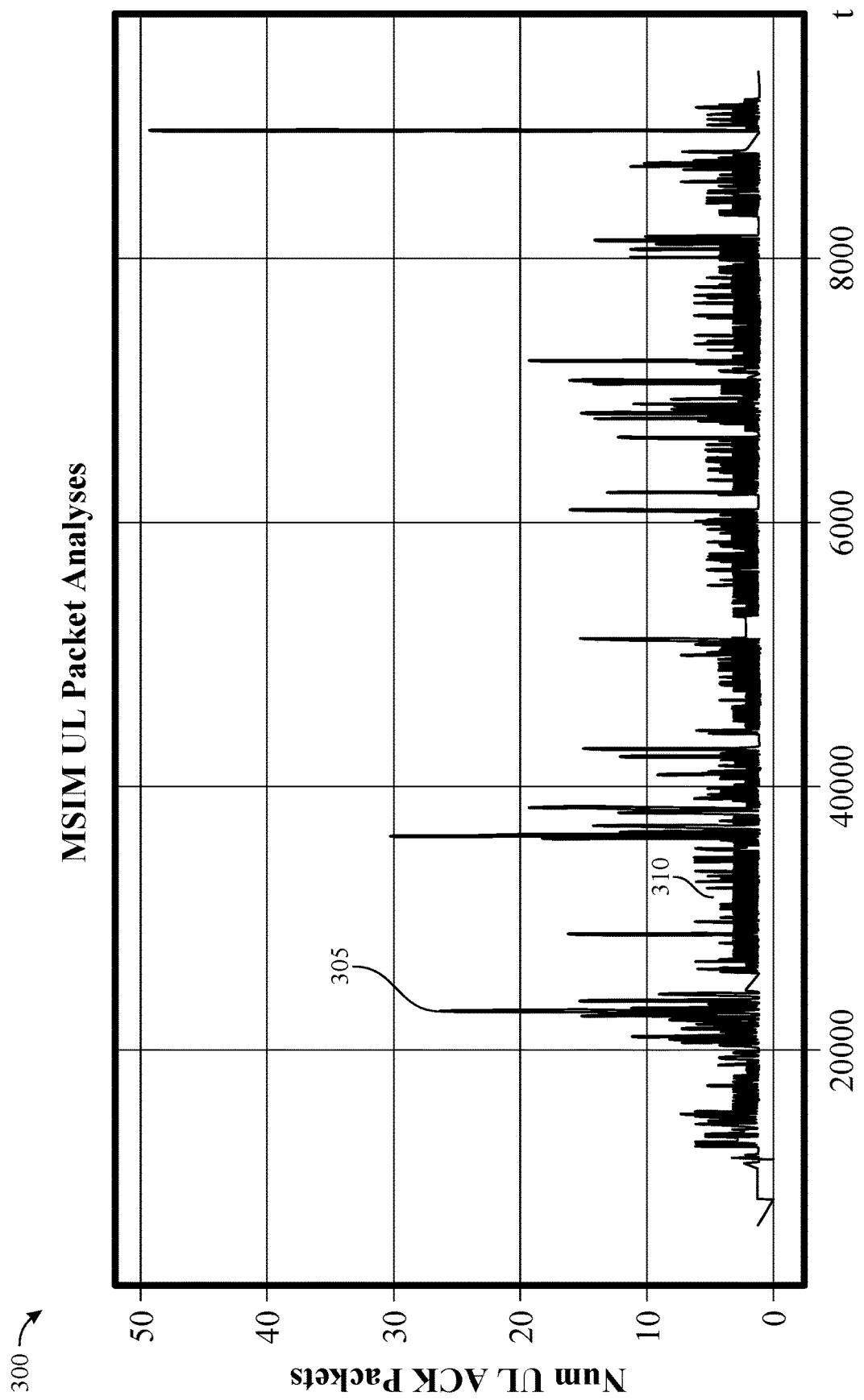
FIG. 3 is a graph illustrating an example amount of uplink transmission of transport protocol acknowledgment packets over a time period.
Figure 4:
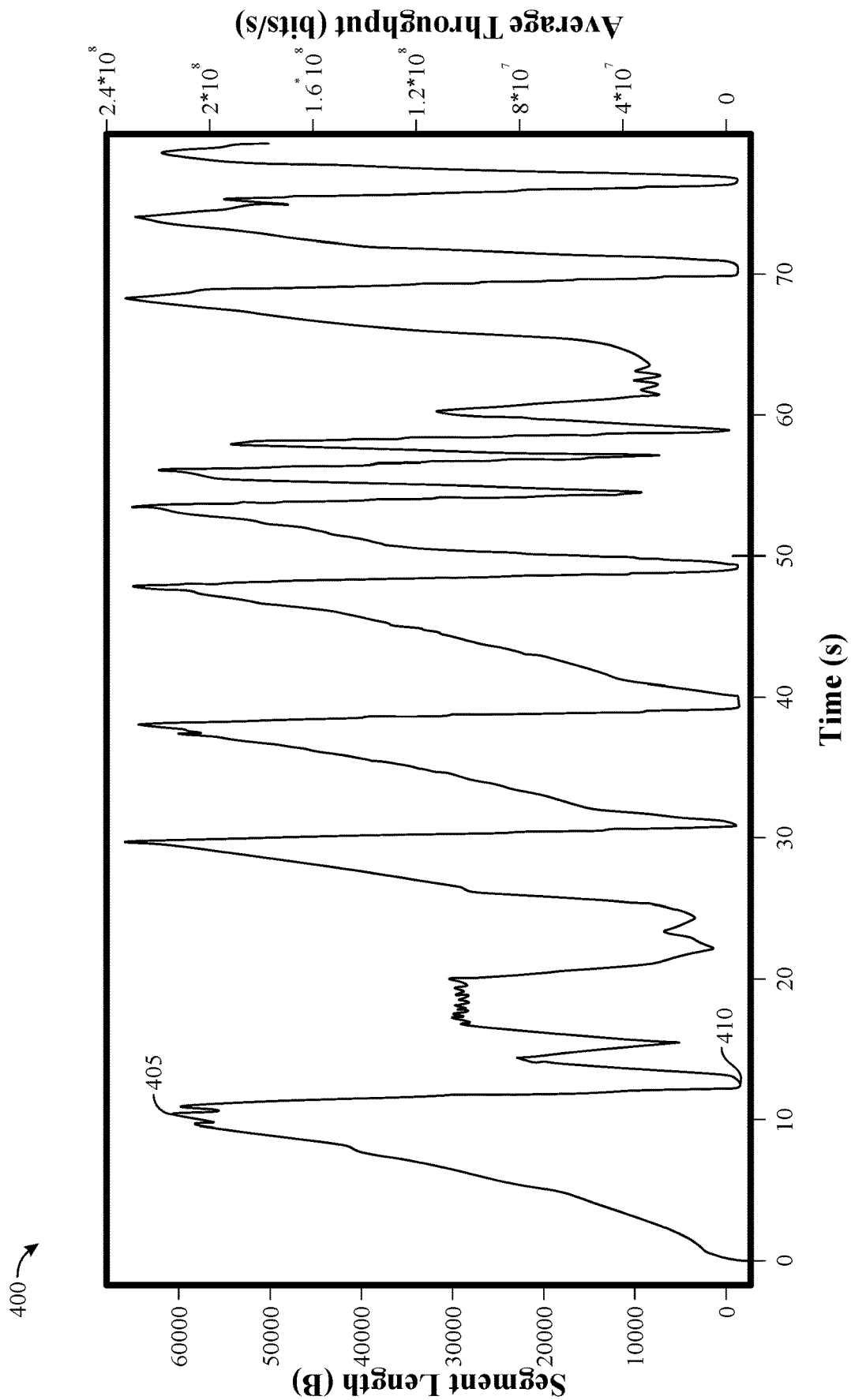
FIG. 4 is a graph illustrating an example throughput during the time period.

As shown in the graph 300 in FIG. 3, uplink transmission of the transport protocol acknowledgments may occur in bursts. In the example illustrated in graph 300, in some instances, the receiving host may send a burst of transport protocol ACKs (e.g., peak 305) in a duration including a large number of ACKs relative to an average number of transport protocol ACKS (e.g., average 310). Thus, the bursts can be said to have a large peak-to-average rate of uplink transport protocol ACKs. As shown in the example graph 400 in FIG. 4, the bursts of UL transport protocol ACKs may lead to buffer overflow, which in turn leads to reduce downlink data throughput. For example, the large number of ACKs may cause the sending host to send a large amount of downlink data that overloads the buffer (e.g., at the BS) and then remaining packets may be lost, reducing the throughput. As shown in FIG. 4, when the downlink data peaks (e.g., peak 405), such as in response to a burst of UL transport protocol ACKs (e.g., in response to peak 305), and overflows the buffer, the downlink throughput drops (e.g., valley 410) due to TCP's reaction to packet loss.

Uplink transport protocol ACK bursting (e.g., high ACK rate) may be caused by various scenarios. In an example, UL transport protocol ACK bursting may occur when the UE (e.g., at layer 2 (L2)) prioritizes transmission of ACKs over other data. In this scenario, when an uplink grant is delayed, the transport protocol ACK buffer builds and the UE transmits all of the buffered ACKs at once—in a burst. In another example, UL transport protocol ACK bursting may occur in response to a downlink data burst. For example, when recovering a hole or holes at the radio link control (RLC) layer, the RLC layer may deliver a large burst of data to the transport layer, leading to a burst of transport protocol ACKs from the host. In such a scenario, the issue may be exacerbated in multi-SIM (MSIM) scenarios where RLC recovery may be more frequent due to tune away from a serving cell. In another example, UL transport protocol ACK bursting may occur when a wireless local area network (WLAN) station, in the case of a mobile hotspot, incurs delays in accessing the WLAN medium. Once the WLAN station accesses the data, the WLAN station may send a burst of transport protocol ACKs to the UE, which in turn bursts it on a wireless wide area network (WWAN). In yet another example, UL transport protocol ACK bursting may occur when a host scheduler schedules a task with some delay. Once the task runs, large amounts of transport protocol data is processed and corresponding UL transport protocol ACKs are created and transmitted. In yet another example, UL transport protocol ACK bursting may occur when delays are implemented in modem accumulation and/or aggregation timers.

The examples described above are merely illustrative of certain scenarios that may lead to UL transport protocol ACK bursting. The description is not intended to be limited to these examples, other scenarios can be lead to UL transport protocol ACK bursting and may be addressed by the techniques described herein, for UL transport protocol ACK shaping and/or downlink data shaping, in more detail below. Because UL transport protocol ACK bursting can be caused by a variety of scenarios, it may not be simple/possible to eliminate all sources causing UL transport protocol ACK bursting.

On the downlink, the UE (e.g., at L2) may accumulate large amounts of data due to reordering. The transfer speed between the modem of the UE and the host of the UE can vastly exceed that of the air interface between the UE and the BS and/or sending host, such as due to speed of double data rate (DDR)/direct memory access (DMA). This can create issues for the host of the UE. For example, the host may handle the data and may deliver a large number of ACKs (e.g., an issue of ACK bursting). The host may not be ready for the large number of ACKs and can incur delay or packet loss when processing such large burst. Additionally, the host (e.g., central processing unit (CPU)) may become overloaded by the high rate of the burst.

Thus, aspects of the present disclosure provide techniques for UL ACK shaping and DL data shaping. The UL ACK shaping and DL data shaping may allow the UE to control the rate or amount of UL transport protocol ACKs transmitted in a TTI (e.g., in an UL slot, such as a PUSCH slot) and/or the rate or amount of data units (e.g., transport protocol data only, or all data) transmitted to the host per unit of time.

There may be no single optimal UL transport protocol ACK rate for all scenarios. For example, the UE must release (i.e., transmit) some minimum amount of UL transport protocol ACKs in order to keep the BS buffer replenished (e.g., to maintain a level of throughput); however, the UE may not know how much buffer the BS has for the UE or if the buffer is shared with other UEs. Also the buffer occupancy at the BS may vary over time. Additionally, there may be no throughput increase by building a bigger buffer at the BS. When the UE transmits less than the minimum amount of UL transport protocol ACKs, the sending host may become window-limited. But when the UE transmits too many UL transport protocol ACKs, the BS buffer may overflow and the sending host downlink data rate may drop. Accordingly, aspects of the present disclose provide techniques for determining (e.g., by the UE) the amount/rate of UL transport protocol ACKs to transmit in a duration.

Figure 5:
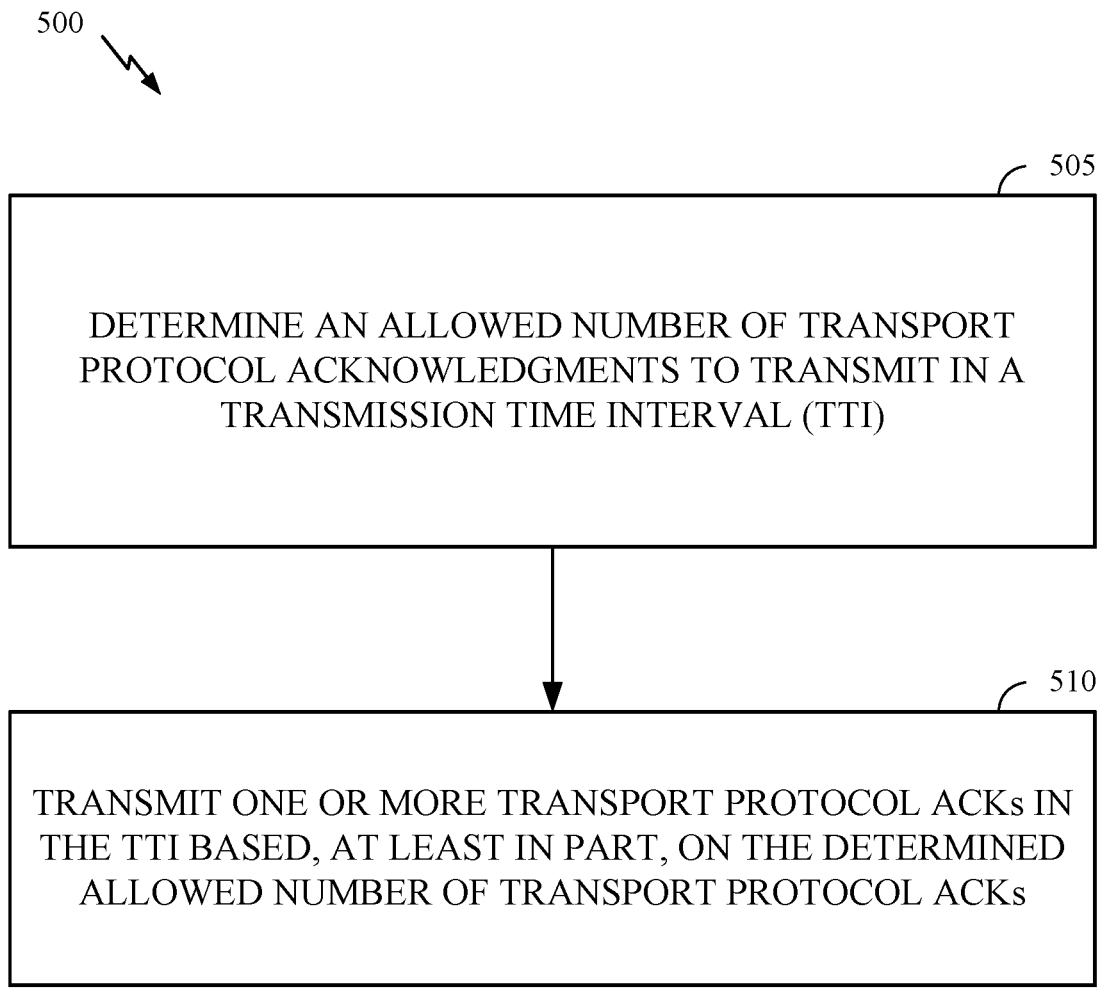
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by UE (e.g., such as at a modem of the UE 120a in the wireless communication network 100) during uplink transmission. Operations 500 may be implemented as software components that are executed and run on one or more processors (e.g., controller/processor 1180 of FIG. 11). Further, the transmission and reception of signals by the UE in operations 500 may be enabled, for example, by one or more antennas (e.g., antennas 1152 of FIG. 11). In certain aspects, the transmission and/or reception of signals by the UE may be implemented via a bus interface of one or more processors (e.g., controller/processor 1180) obtaining and/or outputting signals.

The operations 500 may begin, at 505, by determining an allowed number of transport protocol ACKs to transmit in a TTI (e.g., a PUSCH slot). In some cases, as noted below, the allowed number of transport protocol ACKSs may comprise at least one of an allowed number of bytes acknowledged or an allowed number of transport protocol acknowledgment packets.

At 510, the UE transmits one or more transport protocol ACKs in the TTI based, at least in part, on the determined allowed number of transport protocol acknowledgments.

In some cases, the UE may determine the allowed number of transport protocol acknowledgments by computing an average rate of incoming transport protocol acknowledgments into a modem of the UE (e.g., modem 210), determining a maximum peak to average rate ratio, and determining the allowed number of transport protocol acknowledgements based on the maximum peak to average rate ratio. In some cases, the UE may compute the incoming rate per transport layer connection, or overall (per UE), or per peripheral (e.g., an embedded host or tethered host).

Various techniques presented herein may be used to effectively shape traffic assuming the use of a "token bucket" algorithm. According to certain aspects, the UE may determine the allowed number of transport protocol acknowledgments by computing an average rate of incoming transport protocol acknowledgments (e.g., incoming to the modem 210 of the UE from the transport protocol host 205 of the UE), computing a fill rate of a token bucket based on a rate increase margin value and the computed average rate of incoming transport protocol acknowledgments, and computing a depth of the token bucket based on a burst duration value and the computed average rate of incoming transport protocol acknowledgments. The number of ACKs allowed in the TTI (e.g., PUSCH slot) may be controlled/shaped by the token bucket. For example, the UE may include a transport protocol acknowledgment (ACK) for transmission in the TTI only when a token is available in the token bucket to be removed for the transport protocol acknowledgment.

The UE may perform the traffic shaping per transport layer connection, or overall (per UE), or per peripheral (embedded host, tethered hosts).

In some examples, the UE (e.g., modem) may compute an average of the UL transport protocol ACK rate R. The UE may compute a moving average or an average based on a given time window (e.g., a predetermined or specified duration, such as a 1 second window). In some examples, the UE may compute the average in ACK packets per second. In some examples, the UE may compute the average in bytes ACKed per second. Thus, in some cases, the allowed number of acknowledgments in duration may be determined as the allowed number of bytes acknowledged by corresponding transport protocol acknowledgment packets in the duration.

The fill rate of the token bucket may depend on the average rate of incoming transport protocol acknowledgments, R. The fill rate of the token bucket may correspond to a rate at which the UE is allowed to include transport protocol acknowledgments for transmission in the TTI. In some cases, the fill rate may be derived based on the capacity available in the data direction. In some examples, the token bucket fill rate may be computed based on a product of the rate increase margin value and the computed average rate of incoming transport protocol acknowledgments (e.g., bucket fill rate=R*margin). The rate increase margin may allow a rate ramp up. Thus, the rate increase margin value may be greater than 1 (e.g., 1.1×), which may allow ACKing faster than the average ACK rate R.

In some cases, the depth of the token bucket may be a maximum allowable number of tokens in the token bucket corresponding to the maximum allowable number of transport protocol acknowledgments the UE includes for transmission in the TTI. In some examples, the token bucket fill rate may be computed based on a product of the computed average rate of incoming transport protocol acknowledgments and a burst duration value (e.g., bucket depth=max_burst*R). In some examples, the burst duration value (e.g., max_burst) may be based on the BS buffer size. In some cases, the burst duration value (e.g., 200 ms) may be greater than an average scheduling interval (e.g., 5 ms).

According to certain aspects, in some cases, the UE may update the average rate of incoming transport protocol acknowledgments, the fill rate, and the depth of the token bucket periodically.

According to certain aspects, in some cases, the UE may determine the allowed number of transport protocol acknowledgments to transmit in the TTI per flow (e.g., per transport protocol flow).

In an illustrative example, a first flow may use 10 ACKs to ACK 1 MB, while another flow may use 100 ACKs to ACK 1 MB. Thus, according to certain aspects, in order to determine the number of transport protocol byes being ACKed, the UE may look into the packet header (e.g., a TCP header) to find the ACK sequence number (SN) values. In some examples, the UE (e.g., at the modem data layer) may add a flow identifier and/or a number of acknowledged bytes (e.g., flow_ID, ack_bytes) to the descriptor of each ACK packet or per batch of packets. In some examples, data hardware can do this deep packet inspection, and store for future use by layer 2, to avoid layer 2 deep packet inspection.

In some cases, the number of ACKs (e.g., bytes) allowed per transport protocol flow in the TTI (e.g., for layer 1 (L1) physical transmission) may be controlled via the token bucket. For example, the number of the included transport protocol acknowledgment bytes may correspond to a number of the tokens available in the token bucket to be removed for the transport protocol acknowledgment. There may one token per transport protocol flow and, for a given flow at a given time, the UE (e.g., the L2) may send as many ACK bytes as there are in the token at that time. In some cases, the UE (e.g., the L2) may know the amount ACKed based on the packet descriptor.

In some cases, when tokens run out in the token buffer, the UE (e.g., the L2) may still have granted resources available, but cannot include more ACKs for transmission (for this flow, if operation is per flow). In some examples, ACKs not transmitted may be buffered and transmitted in a later TTI. In some examples, the UE may use the remaining granted resources to serve non-ACK traffic (e.g., data) from the same flow, to serve ACK traffic from another flow, and the like. In some examples, when there is no data other than forbidden ACKs, then the UE (e.g., L2) may include padding bytes and/or copies of data in the TTI.

In other words, in some cases, the transmitting the one or more transport protocol acknowledgments in the TTI based, at least in part, on the determined allowed number of transport protocol acknowledgments may include transmitting a first portion of transport protocol acknowledgments from a UE transmit buffer in the TTI, while leaving second portion of transport protocol acknowledgments in the UE transmit buffer (e.g., for transmission in a subsequent TTI).

According to certain aspects, the UE may send a buffer status report (BSR) after the transmission of the one or more transport protocol acknowledgments, reporting one or more buffered transport protocol acknowledgments that were not allowed in a previous transmission even if no new data arrived in the UE for transmission. For example, in some cases, the UE (e.g., L2) may use a new internal BSR trigger to report ACKs already queued, but not allowed in a previous transmission due to token bucket limit. In the BSR, the UE (e.g., L2) may not report ACKs that are not allowed at that time, based on the token bucket shaping.

According to certain aspects, the UE may apply UL transport protocol ACK shaping when the transport protocol is out of the slow start phase, such as when the transport protocol rate adaptation method is in a congestion avoidance phase.

According to certain aspects, the UE may apply UL transport protocol ACK shaping when the UL transport protocol ACK rate is above a threshold (e.g., a predefined or specified threshold) and/or when the downlink data rate is above a threshold (e.g., a predefined or specified threshold). For example, when the UL transport protocol ACK rate and/or data throughput is low enough, there may be enough buffer in the B S and the shaping may not be needed.

In some examples, the average rate of incoming transport protocol ACKs may be determined according to:

$$Y_n = (1-\alpha)*Y_{n-1} + \alpha*X_n,$$

where $X_n$ is the number of ACKs received from an upper layer of the UE in the last x milliseconds, and a is a filter co-efficient. $Y_n$ may be compared with minAck (e.g., the maximum between the two may be chosen for Token) to ensure slow start is not significantly impacted by ACK shaping (e.g., $T_{ACK} = \max(Y_n, \text{minAck})$). Another factor may be used to account for the uplink scheduling rate. For example, every TTI the UE (e.g., L2) may compute the uplink scheduling rate (r) and while picking up ACKs, the UE may pick ($r*T_{ACK}$).

In some cases, the UE (e.g., modem 210) may perform downlink data shaping similar to the UL transport protocol ACK shaping described above. The DL data shaping may be based on average data rate, per flow, per bearer, per packet data network (PDN), and or per end point.

Figure 6:
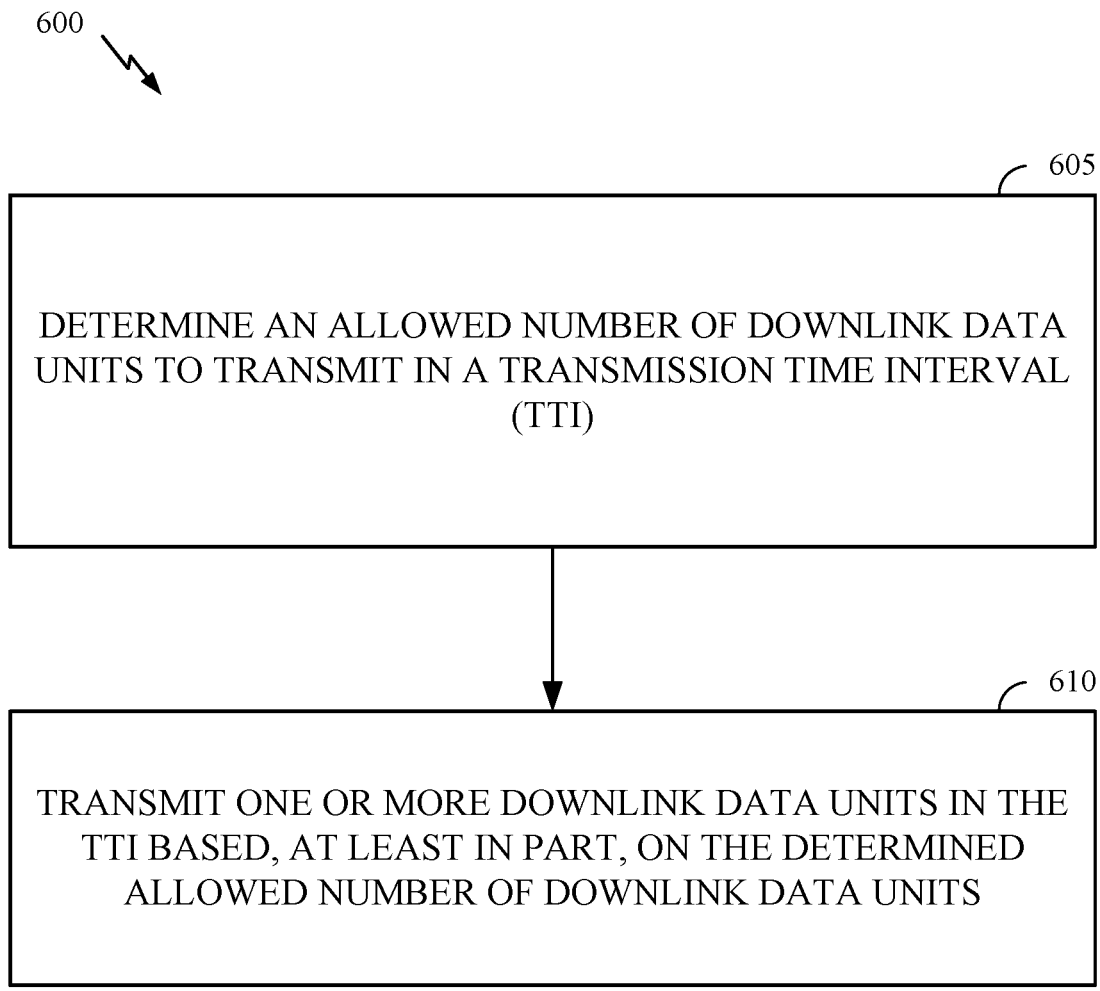
FIG. 6 is a flow diagram illustrating example operations for wireless communications by a UE, in accordance with certain aspects of the present disclosure.
Figure 7:
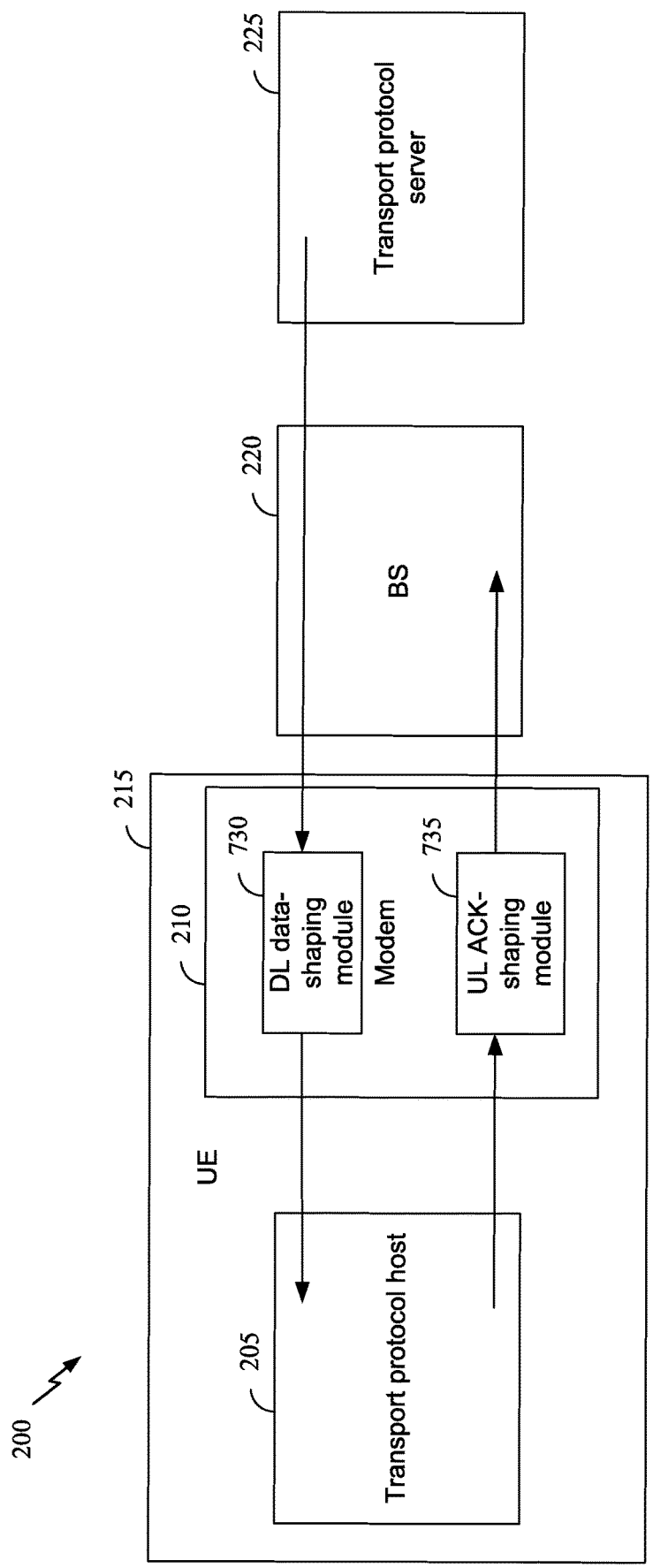
FIG. 7 is a block diagram conceptually illustrating a UE, BS, and server configured for transport protocol, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., such as at a modem of the UE 120a in the wireless communication network 100) during downlink transmission. Operations 600 may be implemented as software components that are executed and run on one or more processors (e.g., controller/processor 1180 of FIG. 11). Further, the transmission and reception of signals by the UE in operations 600 may be enabled, for example, by one or more antennas (e.g., antennas 1152 of FIG. 11). In certain aspects, the transmission and/or reception of signals by the UE may be implemented via a bus interface of one or more processors (e.g., controller/processor 1180) obtaining and/or outputting signals.

At 605, the UE may determine an allowed number of downlink data units to transmit (e.g., to a host or peripheral) in an amount of time (e.g., TTI). In some cases, as described in greater detail below, the allowed number of downlink data units may comprise at least one of an allowed number of downlink data packets or an allowed number of downlink data bytes.

At 610, the UE may transmit one or more data units in the TTI based, at least in part, on the determined allowed number of data units.

According to certain aspects, the UE may compute an average rate of incoming downlink data units into a modem of the UE (e.g., modem 210), determine a maximum peak to average rate ratio, and determine the allowed number of downlink data units based on the maximum peak to average rate ratio.

According to certain aspects, the UE may compute an average rate of incoming downlink data units into a modem of the UE, computes a fill rate of a token bucket based on a rate increase margin value and the computed average rate of incoming downlink data units, and computes a depth of the token bucket based on a burst duration value and the computed average rate of incoming downlink data units. In some examples, the fill rate of the token bucket may depend on the average rate of incoming downlink data units and may correspond to a rate at which the UE is allowed to include downlink data units for transmission in the TTI to a transport protocol endpoint (e.g., transport protocol host 205) at the UE or peripheral. In some examples, the UE may include a downlink data unit for transmission in the TTI when a token is available in the token bucket to be removed for the downlink data unit.

In some cases, transmitting the one or more downlink data units in the TTI (e.g., based, at least in part, on the determined allowed number of data units) may include forwarding a first portion of data units from a UE receive buffer for processing in the TTI (e.g., from the modem 210 to the transport protocol host 205), while leaving a second portion of data units in the UE receive buffer (e.g., known as DL data shaping). In some cases, forwarding the first portion of data units from the UE receive buffer for processing in the TTI while leaving the second portion of data units in the UE receive buffer may be performed when tokens run out in the token buffer or when the UE does not have enough tokens in the token buffer to transmit all of the downlink data units (e.g., from the modem 210 to the transport protocol host 205).

In some examples, the token bucket fill rate may be computed based on a product of the rate increase margin value (e.g., greater than 1) and the computed average rate of incoming downlink data units. In some examples, the depth of the token bucket may comprise a maximum allowable number of tokens in the token bucket corresponding to the maximum allowable number of downlink data units the UE includes for transmission in the TTI. In some examples, the burst duration value may be greater than an average scheduling interval.

In some examples, the average rate of incoming downlink data units may be computed as a moving average or over a specified time window. In some examples, the average rate of incoming downlink data units may be computed as an average rate of incoming downlink data packets. In some examples, the average rate of incoming downlink data units, the fill rate, and the depth of the token bucket may be updated periodically by the UE. In some examples, the average rate of incoming downlink data units may be computed as an average rate of incoming downlink data bytes.

In some examples, the allowed number of downlink data units to transmit in the TTI may be determined per flow, per bearer, per packet data network (PDN), or per transport protocol end point.

In some examples, for each downlink data unit, the UE may check a packet header to determine a number of downlink data bytes in the downlink data unit packet. In some examples, the UE may include a number of the downlink data bytes from the downlink data packet for transmission in the TTI. In some cases, the number of the included downlink data bytes may correspond to a number of the tokens available in the token bucket to be removed for the downlink data bytes. In some examples, the packet header may be included per packet or per group of packets.

In some examples, the UE may determine that no tokens are available in the token bucket and may include data from a different bearer, repeated data or control data, and/or padding in the TTI based on the determination.

In some examples, the UE may determine the allowed number of downlink data units when the transport protocol is in a congestion avoidance phase. In some examples, the UE may determine the allowed number of downlink data units when a data rate is above a threshold. In some examples, the UE may determine the allowed number of downlink data units when a downlink data unit rate is above a threshold.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Referring back to the transport protocol system 200 illustrating in FIG. 2, the UE 215 may include a transport protocol host 205. The transport protocol 205 may control and convert signals transmitted and received by the UE 215 for the transport protocol. The modem 210 of the UE 215 may include a DL data-shaping module 730 configured to perform the DL-data shaping as discussed herein. For example, the DL data-shaping module 730 may control the rate/number of DL data unit received from the transport protocol server 225, and/or from the BS 220, that the modem 210 provides to the transport protocol host 205 of the UE 215 in a TTI. Additionally or alternatively, the Modem 210 of the UE 215 may include UL ACK-shaping module 735 configured to perform the UL-ACK shaping as discussed herein. For example, the UL ACK-shaping module 735 may control the rate/number of UL transport protocol ACKs incoming from transport protocol host 205 of the UE 215 that the modem 210 provides to the transport protocol server 225, via the BS 220, in a TTI.

Figure 8:
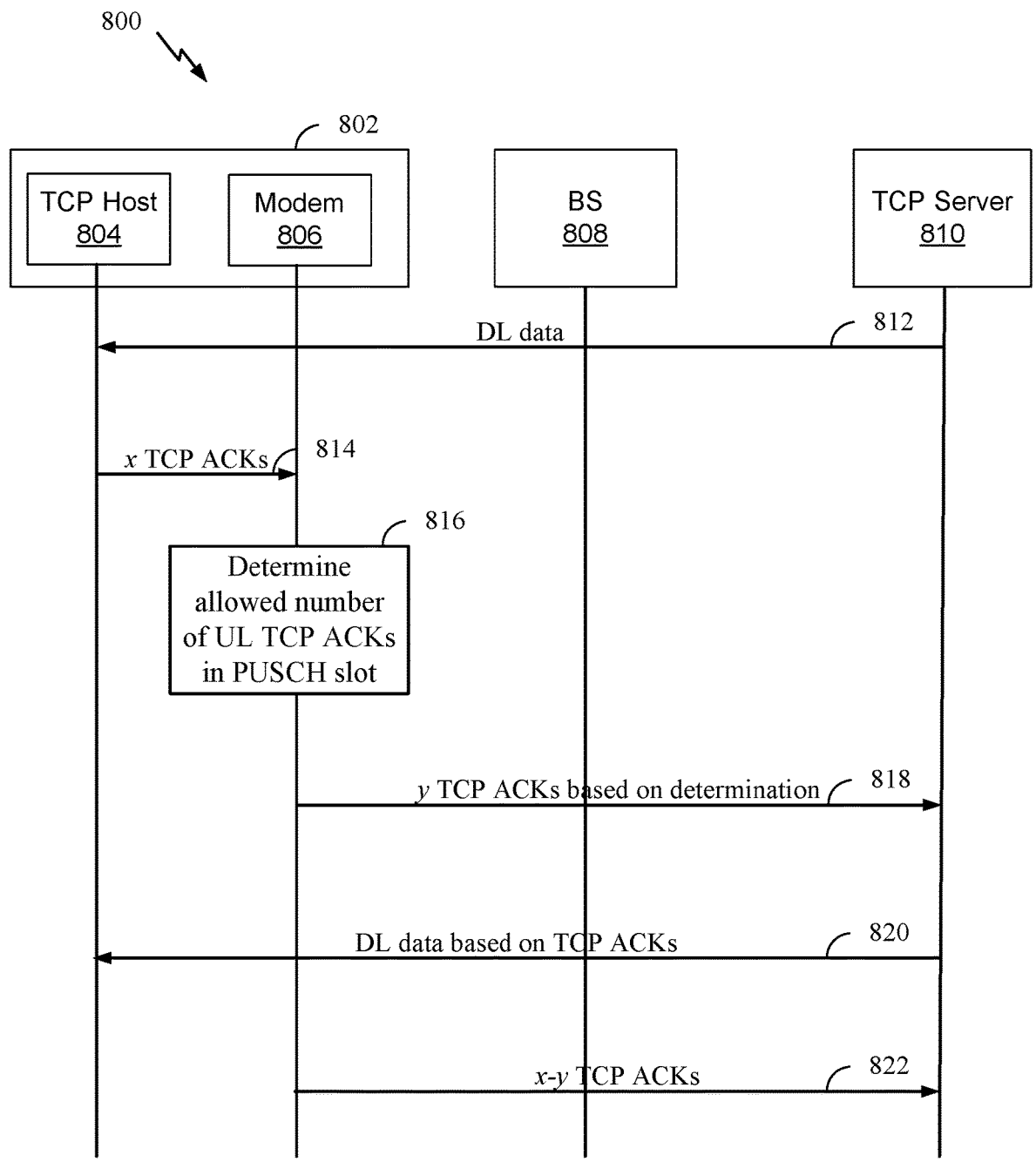
FIG. 8 is a call flow for UL transport protocol ACK shaping, in accordance with certain aspects of the present disclosure.

FIG. 8 is a call flow 800 illustrating example operations and signaling for UL ACK shaping, in accordance with aspects of the present disclosure. As shown in the call flow 800, the UE 802 is configured with a modem 806 and a TCP host 804 for TCP with the TCP server 810 via the BS 808. At 812, the UE 802 receives downlink data from the TCP host 804 via the BS 808. At 814, the TCP host 804 may deliver a burst of x TCP ACKs to the modem 806. At 816, the UE 802 determines the allowed number of TCP ACKs to transmit in a PUSCH slot. Thus, based on the shaping determination, at 818, the modem 806 may only send y TCP ACKs (y<x) in the PUSCH slot. Then at 820, the TCP server 810 may send DL data based on the UL TCP ACKs that will not overflow the buffer at the BS 808. Later (e.g., in a subsequent slot), at 822, the UE 802 may transmit the remaining x-y TCP ACKs.

Figure 9:
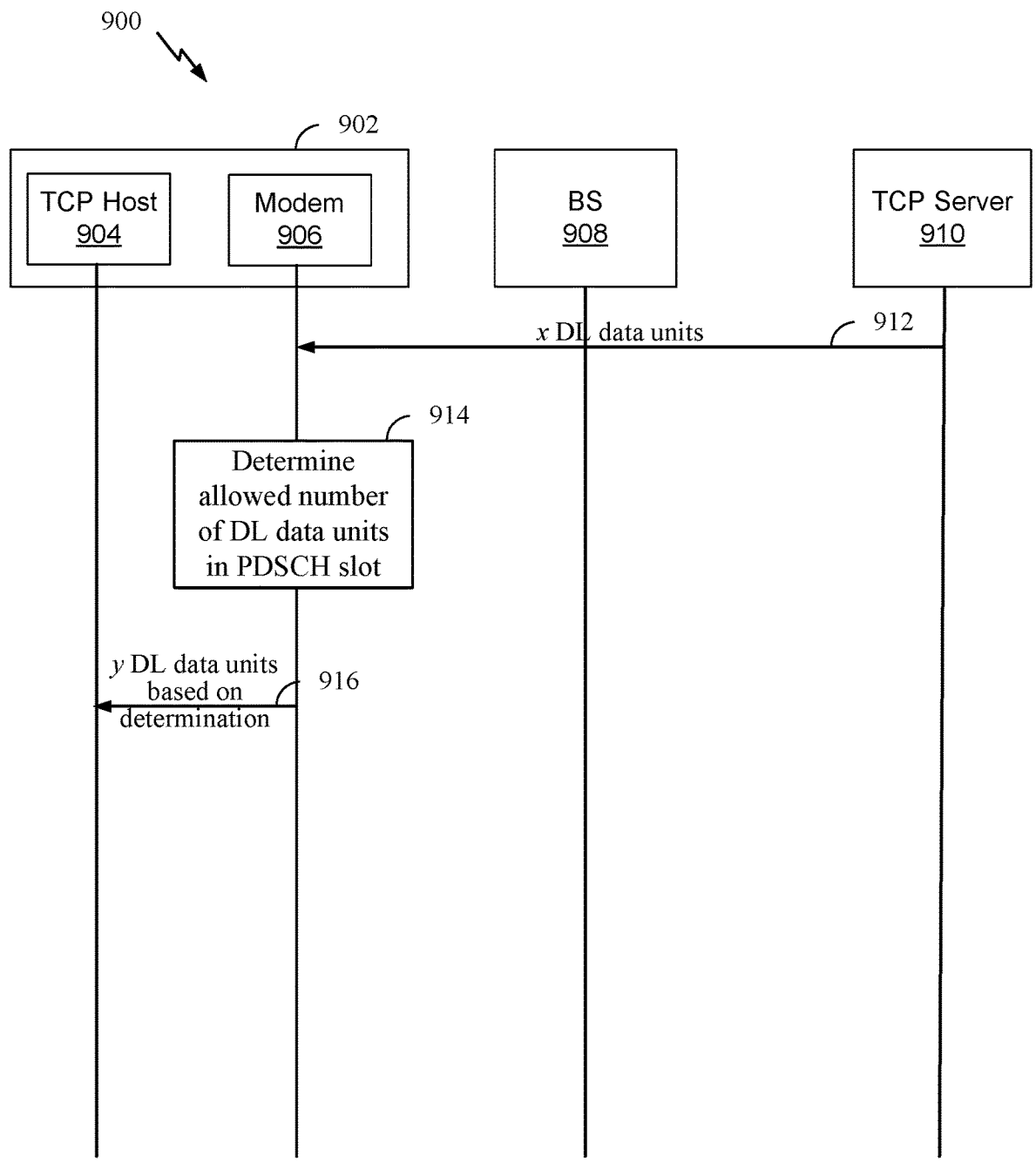
FIG. 9 is a call flow for downlink data shaping, in accordance with certain aspects of the present disclosure.

FIG. 9 is a call flow 900 illustrating example operations and signaling for DL data shaping, in accordance with aspects of the present disclosure. As shown in the call flow 900, the UE 902 is configured with a modem 906 and a TCP host 904 for TCP with the TCP server 910 via the BS 908. At 912, the modem 906 at the UE 902 receives x DL data units from the TCP host 904 via the BS 908. At 914, the UE 902 determines the allowed number of DL data units to transmit in a PDSCH slot. Thus, based on the shaping determination, at 916, the modem 906 may only send y DL data units (y<x) in the PDSCH slot to the TCP host 904.

Figure 10:
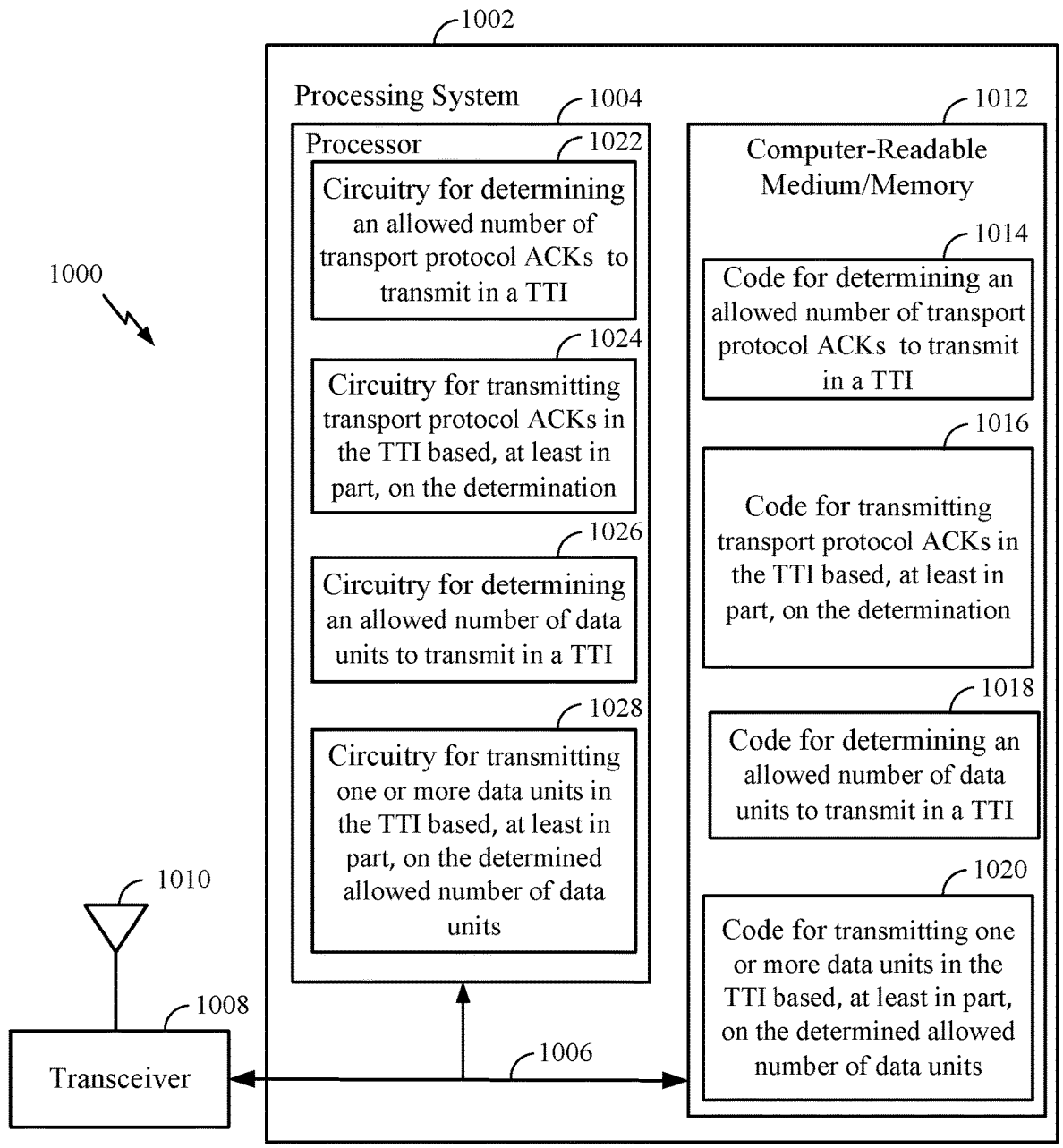
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 5 and/or FIG. 6, as well as other operations described herein for shaping the delivery of transport protocol acknowledgments for uplink transmission and downlink data shaping. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 5 and/or FIG. 6, or other operations for performing the various techniques discussed herein for UL transport protocol ACK shaping and DL data shaping. In certain aspects, computer-readable medium/memory 1012 stores code 1014 for determining an allowed number of transport protocol ACKs to transmit in a TTI; code 1016 for transmitting one or more transport protocol ACKs in the TTI based, at least in part, on the determined allowed number of transport protocol ACKS; code 1018 for determining an allowed number of data units to transmit in a TTI; and code 1020 for transmitting one or more data units in the TTI based, at least in part, on the determined allowed number of data units. In certain aspects, the processor 1004 has circuitry configured to implement the code stored in the computer-readable medium/memory 1012. The processor 1004 includes circuitry 1022 for determining an allowed number of transport protocol ACKs to transmit in a TTI; circuitry 1024 for transmitting one or more transport protocol ACKs in the TTI based, at least in part, on the determined allowed number of transport protocol ACKs; circuitry 1024 for determining an allowed number of data units to transmit in a TTI; and circuitry 1028 for transmitting one or more data units in the TTI based, at least in part, on the determined allowed number of data units.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), WLAN, and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 11:
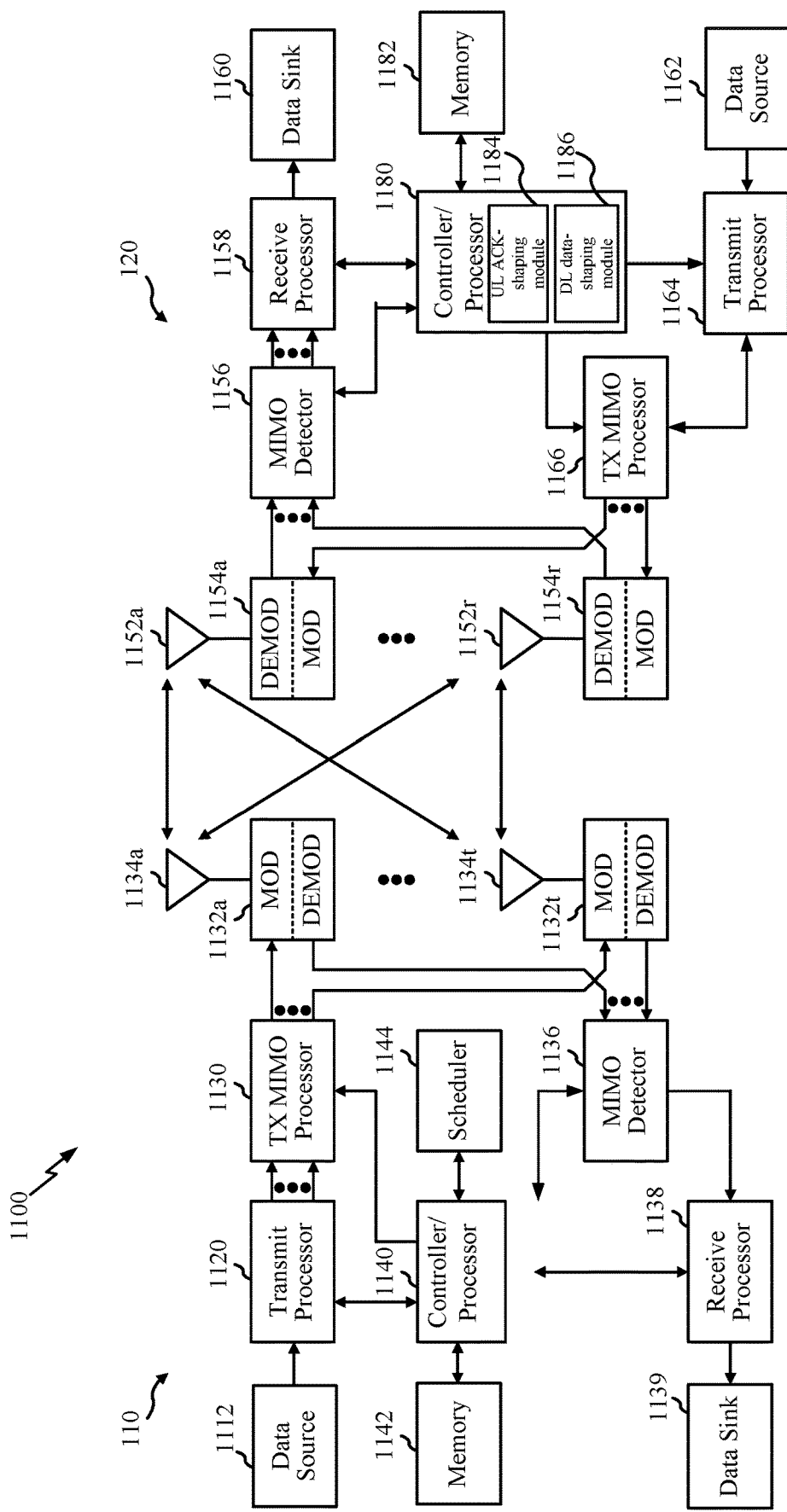
FIG. 11 is a block diagram conceptually illustrating a design of an example BS and UE, in accordance with certain aspects of the present disclosure.

FIG. 11 illustrates example components of BS 110*a* and UE 120*a* (e.g., in the wireless communication network 100 of FIG. 1), which may be used to implement aspects of the present disclosure. For example, antennas 1152, processors 1166, 1158, 1164, and/or controller/processor 1180 of the UE 120*a* and/or antennas 1134, processors 1120, 1130, 1138, and/or controller/processor 1140 of the BS 110*a* may be used to perform the various techniques and methods described herein.

At the BS 110*a*, a transmit processor 1120 may receive data from a data source 1112 and control information from a controller/processor 1140. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc.

The data may be for the PDSCH, etc. The processor 1120 may process (e.g., encode and symbol map) the data and control information to obtain data symbols and control symbols, respectively. The transmit processor 1120 may also generate reference symbols, such as for the primary synchronization signal (PSS), secondary synchronization signal (SSS), and cell-specific reference signal (CRS). A transmit (TX) multiple-input multiple-output (MIMO) processor 830 may perform spatial processing (e.g., precoding) on the data symbols, the control symbols, and/or the reference symbols, if applicable, and may provide output symbol streams to the modulators (MODs) in transceivers 1132a-1132t. Each modulator in transceivers 1132a-1132t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 1132a-1132t may be transmitted via the antennas 1134a-1134t, respectively.

At the UE 120a, the antennas 1152a-1152r may receive the downlink signals from the BS 110a and may provide received signals to the demodulators (DEMODs) in transceivers 1154a-1154r, respectively. Each demodulator in transceivers 1154a-1154r may condition (e.g., filter, amplify, downconvert, and digitize) a respective received signal to obtain input samples. Each demodulator may further process the input samples (e.g., for OFDM, etc.) to obtain received symbols. A MIMO detector 1156 may obtain received symbols from all the demodulators in transceivers 1154a-1154r, perform MIMO detection on the received symbols if applicable, and provide detected symbols. A receive processor 858 may process (e.g., demodulate, deinterleave, and decode) the detected symbols, provide decoded data for the UE 120a to a data sink 1160, and provide decoded control information to a controller/processor 1180.

On the uplink, at UE 120a, a transmit processor 1164 may receive and process data (e.g., for the PUSCH) from a data source 1162 and control information (e.g., for the physical uplink control channel (PUCCH) from the controller/processor 1180. The transmit processor 1164 may also generate reference symbols for a reference signal (e.g., for the sounding reference signal (SRS)). The symbols from the transmit processor 1164 may be precoded by a TX MIMO processor 1166 if applicable, further processed by the demodulators in transceivers 1154a-1154r (e.g., for SC-FDM, etc.), and transmitted to the BS 110a. At the BS 110a, the uplink signals from the UE 120q may be received by the antennas 1134, processed by the modulators in transceivers 1132a-1132t, detected by a MIMO detector 1136 if applicable, and further processed by a receive processor 1138 to obtain decoded data and control information sent by the UE 120a. The receive processor 1138 may provide the decoded data to a data sink 1139 and the decoded control information to the controller/processor 1140.

The controllers/processors 1140 and 1180 may direct the operation at the BS 110a and the UE 120a, respectively. The controller/processor 1180 and/or other processors and modules at the UE 120a may perform or direct the execution of processes for the techniques described herein. The memories 1142 and 1182 may store data and program codes for BS 110a and UE 120a, respectively. A scheduler 1144 may schedule UEs for data transmission on the downlink and/or uplink.

As shown in FIG. 11, the Controller/processor 1180 of the UE 120a has an UL ACK-shaping module 1184 that may be configured for shaping the delivery of transport protocol ACKs for uplink transmission, according to certain aspects described herein. The UL ACK-shaping module 1184 may be configured to determine the allowed number of transport protocol ACKs to transmit in a TTI, in accordance with aspects of the present disclosure. The UL ACK-shaping module 1184 may be configured to transmit one or more transport protocol ACKs in the TTI based, at least in part, on the determined allowed number of transport protocol ACKs. As shown in FIG. 11, the Controller/processor 1180 of the UE 120a has a DL data-shaping module 1186 that may be configured for shaping data for downlink transmission, according to certain aspects described herein. The DL data-shaping module 1186 may be configured to determine the allowed number of downlink data units to transmit in a TTI, in accordance with aspects of the present disclosure. The DL data-shaping module 1186 may be configured to transmit one or more data units in the TTI based, at least in part, on the determined allowed number of data units.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and FIG. 6, as well as other operations for performing the various techniques discussed herein for UL transport protocol ACK shaping and DL data shaping.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
   determining an allowed number of transport protocol acknowledgments to transmit in a transmission time interval (TTI), wherein the allowed number of transport protocol acknowledgments comprises at least one of:
   an allowed number of bytes acknowledged; or
   an allowed number of transport protocol acknowledgment packets;
   transmitting one or more transport protocol acknowledgments in the TTI based, at least in part, on the determined allowed number of transport protocol acknowledgments, comprising:
      transmitting a first portion of the one or more transport protocol acknowledgments from a UE transmit buffer in the TTI, and
      leaving a second portion of the one or more transport protocol acknowledgments in the UE transmit buffer; and
   sending a buffer status report (BSR) after the transmission of the first portion of the one or more transport protocol acknowledgments, even if no new data arrived in the UE, the BSR reporting the second portion of the one or more transport protocol acknowledgments that were left in the UE transmit buffer.

2. The method of claim 1, wherein determining the allowed number of transport protocol acknowledgments comprises:
   computing an average rate of incoming transport protocol acknowledgments into the UE;
   determining a maximum peak to average rate ratio; and
   determining the allowed number of transport protocol acknowledgements based on the maximum peak to average rate ratio.

3. The method of claim 1, wherein determining the allowed number of transport protocol acknowledgments comprises:
   computing an average rate of incoming transport protocol acknowledgments into the UE;
   computing a burst duration; and
   using a rate-limiting operation to determine the allowed number of transport protocol acknowledgments based on the computed average rate of incoming transport protocol acknowledgments and burst duration.

4. The method of claim 3, wherein:
   the average rate of incoming transport protocol acknowledgments is computed as a moving average or over a specified time window; and
   the burst duration is greater than an average scheduling interval.

5. The method of claim 3, wherein using the rate-limiting operation to determine the allowed number of transport protocol acknowledgments comprises:
   computing a fill rate of a token bucket based on a rate increase margin value and the computed average rate of incoming transport protocol acknowledgments, wherein the fill rate of the token bucket depends on the average rate of incoming transport protocol acknowledgments and corresponds to a rate at which the UE is allowed to include transport protocol acknowledgments for transmission in the TTI;
   computing a depth of the token bucket based on the burst duration and the computed average rate of incoming transport protocol acknowledgments; and
   including a transport protocol acknowledgment in the allowed number of transport protocol acknowledgments for transmission in the TTI only when a token is available in the token bucket to be removed for the transport protocol acknowledgment.

6. The method of claim 5, wherein:
   the fill rate of the token bucket is computed based on a product of the rate increase margin value and the computed average rate of incoming transport protocol acknowledgments;
   the depth of the token bucket comprises a maximum allowable number of tokens in the token bucket corresponding to the maximum allowable number of transport protocol acknowledgments the UE includes for transmission in the TTI; and
   the rate increase margin value is greater than 1.

7. The method of claim 3, wherein the average rate of incoming transport protocol acknowledgments is computed as an average rate of incoming transport protocol acknowledgment packets.

8. The method of claim 3, wherein the average rate of incoming transport protocol acknowledgments is computed as an average rate of incoming transport protocol acknowledgment bytes.

9. The method of claim 8, wherein determining the allowed number of transport protocol acknowledgments to transmit in the TTI comprises determining the allowed number of transport protocol acknowledgments to transmit in the TTI per flow.

10. The method of claim 1, further comprising:
    for each transport protocol acknowledgment, checking a packet header of the transport protocol acknowledgment to determine a number of transport protocol acknowledgment bytes in the transport protocol acknowledgment, wherein:
       the UE includes the number of the transport protocol acknowledgment bytes from the transport protocol acknowledgment for transmission in the TTI; and
       the packet header is included per packet or per group of packets.

11. The method of claim 1, wherein at least one of:
    the allowed number of transport protocol acknowledgments is updated each TTI;
    the method is performed at a modem of the UE; or the TTI comprises a physical uplink shared channel (PUSCH) slot.

12. The method of claim 1, further comprising:
    determining the allowed number of transport protocol acknowledgments to transmit in the TTI is reached; and
    including at least one of: data from a different bearer, repeated data or control, or padding in the TTI based on the determination.

13. The method of claim 1, wherein at least one of:
determining the allowed number of transport protocol acknowledgments is performed when the transport protocol is in a congestion avoidance phase;
determining the allowed number of transport protocol acknowledgments is performed when a data rate is above a threshold; or
determining the allowed number of transport protocol acknowledgments is performed when a transport protocol acknowledgment rate is above a threshold.

14. An apparatus for wireless communication by a user equipment (UE), comprising:
at least one processor configured to:
determine an allowed number of transport protocol acknowledgments to transmit in a transmission time interval (TTI), wherein the allowed number of transport protocol acknowledgments comprises at least one of:
an allowed number of bytes acknowledged; or
an allowed number of transport protocol acknowledgment packets;
transmit one or more transport protocol acknowledgments in the TTI based, at least in part, on the determined allowed number of transport protocol acknowledgments,
wherein, in order to transmit the one or more transport protocol acknowledgements in the TTI, the at least one processor is further configured to:
transmit a first portion of the one or more transport protocol acknowledgments from a UE transmit buffer in the TTI, and
leave a second portion of the one or more transport protocol acknowledgments in the UE transmit buffer; and
send a buffer status report (BSR) after the transmission of the first portion of the one or more transport protocol acknowledgments, even if no new data arrived in the UE, the BSR reporting the second portion of the one or more transport protocol acknowledgments that were left in the UE transmit buffer; and
a memory coupled with the at least one processor.

15. The apparatus of claim 14, wherein, in order to determine the allowed number of transport protocol acknowledgments, the at least one processor is further configured to:
compute an average rate of incoming transport protocol acknowledgments into the UE;
determine a maximum peak to average rate ratio; and
determine the allowed number of transport protocol acknowledgements based on the maximum peak to average rate ratio.

16. The apparatus of claim 14, wherein, in order to determine the allowed number of transport protocol acknowledgments, the at least one processor is further configured to:
compute an average rate of incoming transport protocol acknowledgments into the UE;
compute a burst duration; and
using a rate-limiting operation based on the computed average rate of incoming transport protocol acknowledgments and burst duration.

17. The apparatus of claim 16, wherein:
the average rate of incoming transport protocol acknowledgments is computed as a moving average or over a specified time window; and
the burst duration is greater than an average scheduling interval.

18. The apparatus of claim 16, wherein, in order to use the rate-limiting operation to determine the allowed number of transport protocol acknowledgments, the at least one processor is further configured to:
compute a fill rate of a token bucket based on a rate increase margin value and the computed average rate of incoming transport protocol acknowledgments, wherein the fill rate of the token bucket depends on the average rate of incoming transport protocol acknowledgments and corresponds to a rate at which the UE is allowed to include transport protocol acknowledgments for transmission in the TTI;
compute a depth of the token bucket based on the burst duration and the computed average rate of incoming transport protocol acknowledgments; and
include a transport protocol acknowledgment in the allowed number of transport protocol acknowledgments for transmission in the TTI only when a token is available in the token bucket to be removed for the transport protocol acknowledgment.

19. The apparatus of claim 18, wherein:
the fill rate of the token bucket is computed based on a product of the rate increase margin value and the computed average rate of incoming transport protocol acknowledgments;
the depth of the token bucket comprises a maximum allowable number of tokens in the token bucket corresponding to the maximum allowable number of transport protocol acknowledgments the UE includes for transmission in the TTI; and
the rate increase margin value is greater than 1.

20. The apparatus of claim 16, wherein the average rate of incoming transport protocol acknowledgments is computed as an average rate of incoming transport protocol acknowledgment packets.

21. The apparatus of claim 16, wherein the average rate of incoming transport protocol acknowledgments is computed as an average rate of incoming transport protocol acknowledgment bytes.

22. The apparatus of claim 21, wherein, in order to determine the allowed number of transport protocol acknowledgments to transmit in the TTI, the at least one processor is further configured to determine the allowed number of transport protocol acknowledgments to transmit in the TTI per flow.

23. The apparatus of claim 14, wherein:
the at least one processor is further configured to for each transport protocol acknowledgment, check a packet header of the transport protocol acknowledgment to determine a number of transport protocol acknowledgment bytes in the transport protocol acknowledgment, wherein:
the at least one processor is configured to include the number of the transport protocol acknowledgment bytes from the transport protocol acknowledgment for transmission in the TTI; and
the packet header is included per packet or per group of packets.

24. The apparatus of claim 14, wherein at least one of:
the allowed number of transport protocol acknowledgments is updated each TTI;
the at least one processor comprises a modem of the UE; or
the TTI comprises a physical uplink shared channel (PUSCH) slot.

25. The apparatus of claim 14, the at least one processor is further configured to:
  determine the allowed number of transport protocol acknowledgments to transmit in the TTI is reached; and
  include at least one of: data from a different bearer, repeated data or control, or padding in the TTI based on the determination.

26. The apparatus of claim 14, wherein at least one of:
  the at least one processor is configured to determine the allowed number of transport protocol acknowledgments when the transport protocol is in a congestion avoidance phase;
  the at least one processor is configured to determine the allowed number of transport protocol acknowledgments when a data rate is above a threshold; or
  the at least one processor is configured to determine the allowed number of transport protocol acknowledgments when a transport protocol acknowledgment rate is above a threshold.

27. A method for wireless communication by a user equipment (UE), comprising:
  determining an allowed number of transport protocol acknowledgments to transmit in a transmission time interval (TTI), wherein:
    determining the allowed number of transport protocol acknowledgments comprises:
      computing an average rate of incoming transport protocol acknowledgments into the UE;
      determining a maximum peak to average rate ratio; and
      determining the allowed number of transport protocol acknowledgements based on the maximum peak to average rate ratio; and
    the allowed number of transport protocol acknowledgments comprises at least one of:
      an allowed number of bytes acknowledged; or
      an allowed number of transport protocol acknowledgment packets; and
  transmitting one or more transport protocol acknowledgments in the TTI based, at least in part, on the determined allowed number of transport protocol acknowledgments.

28. An apparatus for wireless communication by a user equipment (UE), comprising:
  at least one processor configured to:
    determine an allowed number of transport protocol acknowledgments to transmit in a transmission time interval (TTI), wherein:
      in order to determine the allowed number of transport protocol acknowledgments, the at least one processor is further configured to:
        compute an average rate of incoming transport protocol acknowledgments into the UE;
        determine a maximum peak to average rate ratio; and
        determine the allowed number of transport protocol acknowledgements based on the maximum peak to average rate ratio; and
      the allowed number of transport protocol acknowledgments comprises at least one of:
        an allowed number of bytes acknowledged; or
        an allowed number of transport protocol acknowledgment packets; and
    transmit one or more transport protocol acknowledgments in the TTI based, at least in part, on the determined allowed number of transport protocol acknowledgments; and
  a memory coupled with the at least one processor.

29. A method for wireless communication by a user equipment (UE), comprising:
  determining an allowed number of transport protocol acknowledgments to transmit in a transmission time interval (TTI), wherein:
    determining the allowed number of transport protocol acknowledgments comprises:
      computing an average rate of incoming transport protocol acknowledgments into the UE;
      computing a burst duration; and
      using a rate-limiting operation to determine the allowed number of transport protocol acknowledgments based on a token bucket, the computed average rate of incoming transport protocol acknowledgments, and the burst duration; and
    the allowed number of transport protocol acknowledgments comprises at least one of:
      an allowed number of bytes acknowledged; or
      an allowed number of transport protocol acknowledgment packets; and
  transmitting one or more transport protocol acknowledgments in the TTI based, at least in part, on the determined allowed number of transport protocol acknowledgments.

30. An apparatus for wireless communication by a user equipment (UE), comprising:
  at least one processor configured to:
    determine an allowed number of transport protocol acknowledgments to transmit in a transmission time interval (TTI), wherein:
      in order to determine the allowed number of transport protocol acknowledgments, the at least one processor is further configured to:
        compute an average rate of incoming transport protocol acknowledgments into the UE;
        compute a burst duration; and
        use a rate-limiting operation to determine the allowed number of transport protocol acknowledgments based on a token bucket, the computed average rate of incoming transport protocol acknowledgments, and the burst duration; and
      the allowed number of transport protocol acknowledgments comprises at least one of:
        an allowed number of bytes acknowledged; or
        an allowed number of transport protocol acknowledgment packets; and
    transmit one or more transport protocol acknowledgments in the TTI based, at least in part, on the determined allowed number of transport protocol acknowledgments; and
  a memory coupled with the at least one processor.

* * * * *